United States Patent [19]

Kubo et al.

[11] Patent Number: 5,494,749

[45] Date of Patent: *Feb. 27, 1996

[54] MAGNETIC POWDER FOR MAGNETIC RECORDING AND MAGNETIC RECORDING MEDIUM CONTAINING THE SAME

[75] Inventors: Osamu Kubo; Tatsumi Maeda; Tutomu Nomura; Shunji Kurisu; Etsuji Ogawa, all of Yokohama, Japan

[73] Assignee: Kabushiki Kaisha Toshiba, Kanagawa, Japan

[*] Notice: The term of this patent shall not extend beyond the expiration date of Pat. No. 5,378,547.

[21] Appl. No.: 307,284

[22] Filed: Sep. 16, 1994

Related U.S. Application Data

[63] Continuation-in-part of Ser. No. 869,298, Apr. 16, 1992, Pat. No. 5,378,547.

[30] Foreign Application Priority Data

Apr. 18, 1991 [JP] Japan ........................... 3-86376
Apr. 10, 1992 [JP] Japan ........................... 4-90644

[51] Int. Cl.⁶ .................................................. B32B 5/16
[52] U.S. Cl. .................... 428/402; 252/62.56; 252/62.62; 252/62.63; 428/694 BA; 428/694 BH; 428/900
[58] Field of Search .................... 428/694 BA, 694 BH, 428/900, 402; 252/62.56, 62.62, 62.63

[56] References Cited

U.S. PATENT DOCUMENTS

| | | | |
|---|---|---|---|
| 4,623,603 | 11/1986 | Iimura et al. | 430/108 |
| 4,886,714 | 12/1989 | Torii et al. | 428/694 BA |
| 4,957,812 | 9/1990 | Aoki et al. | 428/329 |
| 5,077,146 | 12/1991 | Kubo et al. | 428/694 BH |
| 5,134,041 | 7/1992 | Zwicky et al. | 428/692 |

*Primary Examiner*—D. S. Nakarani
*Assistant Examiner*—H. Thi Le
*Attorney, Agent, or Firm*—Finnegan, Henderson, Farabow, Garrett & Dunner

[57] ABSTRACT

A magnetic powder for magnetic recording is disclosed which comprises composite magnetic particles (A), each of which contains hexagonal ferrite and spinel structure ferrite, and single phase magnetic particles of hexagonal ferrite (B). When the mixing ratio [(A):(B)] of (A) and (B) in the range from 5:95 to 95:5, remarkable effect can be obtained. Especially, when the mixing ratio of (A) and (B) is in the range from 5:95 to 30:70, the dispersion property is improved due to disturbance of magnetic stacking. Thus, the magnetic powder in this mixing ratio is particularly suitable for magnetic recording in a short wavelength range. When the mixing ratio of (A) and (B) is in the range from 70:30 to 95:5, the reproduction output is improved due to activation of (A). Thus, the magnetic powder in this mixing ratio is specifically suitable for magnetic recording in a long wavelength range. By containing the magnetic powder described above, a perpendicular magnetic recording medium with high electromagnetic characteristics, particularly a high S/N ratio and a low noise can be obtained.

7 Claims, No Drawings

MAGNETIC POWDER FOR MAGNETIC RECORDING AND MAGNETIC RECORDING MEDIUM CONTAINING THE SAME

This is a continuation-in-part of application Ser. No. 07/869,298, filed Apr. 16, 1992, now U.S. Pat. No. 5,378,547.

BACKGROUND OF THE INVENTION

1. Field of the Invention

The present invention relates to a magnetic powder suitable for magnetic recording with high recording density and a magnetic recording medium containing the same for example a magnetic tape.

2. Description of the Related Art

Conventionally, a magnetic recording medium of coating type is made by coating a magnetic powder, in combination with a resin binder on a non-magnetic base material such as a polyethylene film. In recent years, as the need of high recording density of magnetic recording media increases, single phase magnetic particles of hexagonal ferrite in accordance with perpendicular magnetic recording system and magnetic recording medium using them have been developed. The magnetic recording media in accordance with the perpendicular magnetic recording system are mainly made by coating a hexagonal ferrite magnetic powder such as Ba ferrite dispersed in a resin binder on a base material. These powders are plate shaped and have an easily magnetizable axis perpendicular to the plate surface. Each particle of the plate shaped hexagonal ferrite of single phase has a crystal structure where two types of layer units referred to as spinel block (or S block) and R block are regularly layered.

A magnetic recording medium using a hexagonal ferrite magnetic powder in accordance with a perpendicular magnetic recording system can record data in higher density than a conventional magnetic recording medium using a needle shaped magnetic powder in accordance with longitudinal magnetic recording system.

This is because the hexagonal ferrite magnetic powder is made of very fine particles and the particles are so arranged in the magnetic layer, which is made by smoothly coating the particles on the base material with a high packing ratio, that magnetized direction of them are perpendicular to the medium surface and not magnetically repulsive one another. In addition, the magnetic recording media using the hexagonal ferrite powder can provide a higher reproduction output in a short wavelength range than the conventional medium in accordance with longitudinal magnetic recording system.

Recently, a magnetic particle where hexagonal ferrite and spinel structure ferrite are integrated has been proposed so as to enhance the saturation magnetization thereof, the saturation magnetization of the former being lower than that of the latter. This magnetic particle is referred to as a composite magnetic particle. In the crystal structure of the composite magnetic particle, S blocks are irregularly added to other S blocks of the hexagonal ferrite, where S blocks and R blocks are regularly layered. Thereby both S blocks and R blocks are irregularly layered in the crystal structure of this composite magnetic powder. Thus, this composite magnetic particle has been considered to possess both the crystal structure of the spinel ferrite and that of the hexagonal ferrite.

However, thus far it was very difficult to produce a magnetic recording medium which, by using the above mentioned magnetic particles in accordance with the perpendicular magnetic recording system, satisfies all electromagnetic characteristics such as reproducing output and signal-to-noise ratio (hereinafter, referred to as an S/N ratio).

For example, a magnetic powder of hexagonal ferrite is not easily dispersed to a resin binder in comparison with a needle shaped magnetic powder. Thus, so far the reproduction output of the magnetic recording medium produced by coating the magnetic powder of hexagonal ferrite is not higher than that expected. The magnetic particles of hexagonal ferrite tend to be stacked one another magnetically in the direction of their easily magnetizable axes which are vertical direction to the surface of plate shaped particles. Thus, the dispersion property of magnetic particles of hexagonal ferrite has been considered to be deteriorated by this magnetical stacking. As a result, it seems that the magnetic particles of hexagonal ferrite can not display their intrinsic ability. In addition, since the dispersion property is deteriorated, a smooth surface of magnetic layer cannot be easily formed by using hexagonal ferrite. Thus, the magnetic recording by using hexagonal ferrite involves relatively large noise. As described above, since the hexagonal ferrite can hardly be dispersed into the resin binder, the magnetic recording medium using the single phase magnetic particles thereof has not provided a large reproduction output and a high S/N ratio.

SUMMARY OF THE INVENTION

The present invention is made from the above mentioned point of view. In particular, an object of the present invention is to provide a magnetic powder for magnetic recording and a magnetic recording medium using this magnetic powder with an improved dispersion property, thereby reducing noise and obtaining excellent electromagnetic characteristics.

The magnetic powder in accordance with the present invention comprises composite magnetic particles (A), each of which contains hexagonal ferrite and spinel structure ferrite, and single phase magnetic particles of hexagonal ferrite (B).

The magnetic recording medium, made by coating a magnetic powder which is a mixture of the composite magnetic particles (A) and the single phase magnetic particles of hexagonal ferrite (B), has a stronger resistance to noise than that made by using the single phase magnetic particles of hexagonal ferrite (B) does, thereby providing excellent electromagnetic characteristics. In addition, the magnetic recording medium in accordance with the present invention can provide a higher S/N ratio in a short wavelength range than a magnetic recording medium using the composite magnetic particles (A) does.

When the mixing ratio [(A):(B)] of the composite magnetic particles (A) and the single phase magnetic particles of hexagonal ferrite (B) is in the range from 5:95 to 95:5, the above mentioned effects can be remarkably obtained.

The mixing ratio in the present invention represents a weight ratio of the composite magnetic particles (A) and the single phase magnetic particles of hexagonal ferrite (B).

The composite magnetic particles (A) in accordance with the present invention are preferably a compound substantially given by one of the following chemical formula (1).

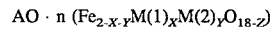

$$AO \cdot n\ (Fe_{2-X-Y}M(1)_X M(2)_Y O_{18-Z}) \quad (1)$$

where A is at least one element selected from the group consisting of Ba, Sr, Ca, and Pb; M(1) is at least one element selected from the group consisting of Co, Zn, Ni, Cu, Mn, and Fe(II); M(2) is at least one element selected from the group consisting of Ti, Sn, Ge, Zr, Sb, Nb, V, Ta, W, and Mo; X is a number in the range from 0.5 to 3.0; Y is a number in the range from 0 to 2.0; Z is a number which is 0.05 or larger and is given by [X+(3−m)Y]/2, where m is the average valence of M(2); and n is a number in the range from 1.0 to 2.0.

The single phase magnetic particles (B) in accordance with the present invention are preferably a compound substantially given by the following chemical formula (2) or (3).

$$AO \cdot Fe_{12-X-Y}M(1)_X M(2)_Y O_{18} \quad \ldots (2)$$

where A is at least one element selected from the group consisting of Ba, Sr, Ca, and Pb; M(1) is at least one element selected from the group consisting of Co, Zn, Ni, Mn, Cu and Fe(II); M(2) is at least one element selected from the group consisting of Sn, Ti, Ge, Zr, V, Nb, Ta, Sb, W, and Mo; X is a number in the range from 0.1 to 1.5; and Y is a number in the range from 0.1 to 1.5.

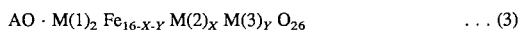

$$AO \cdot M(1)_2 Fe_{16-X-Y} M(2)_X M(3)_Y O_{26} \quad \ldots (3)$$

where A is at least one element selected from the group consisting of Ba, Sr, Ca, and Pb; M(1) is at least one element selected from the group consisting of Co, Zn, Ni, Cu, Mn, and Fe(II); M(2) is at least one element selected from the group consisting of Co, Zn, Ni, Mn, Cu, and Fe(II); M(3) is at least one element selected from the group consisting of Sn, Ti, Zr, Ge, V, Nb, Ta, Sb, W, and Mo; X is a number in the range from 0.1 to 1.5; and Y is a number in the range from 0.1 to 1.5.

More preferably, the average particle diameter of the composite magnetic particles (A) and the single phase magnetic particles of hexagonal ferrite (B) is in the range from 0.02 to 0.2 μm and the coercive force (Hc) thereof being in the range from 200 to 2000 Oe.

When the average particle diameter of the composite magnetic particles (A) and the single phase magnetic particles of hexagonal ferrite (B) is smaller than 0.02 μm, since the particles hardly disperse, the effect of the present invention cannot be obtained. In contrast, when the average particle diameter is larger than 0.2 μm, the reproduction performance in the short wavelength range is deteriorated.

When the mixing ratio [(A):(B)] of the composite magnetic particles (A) and the single phase magnetic particles of hexagonal ferrite (B) in accordance with the present invention is in the range from 5:95 to 30:70, the magnetic recording medium using these particles can be more preferably used for recording and reproducing in a wavelength range of 1 μm or below.

When the mixing ratio [(A):(B)] of these composites is in the range from 70:30 to 95:5, the magnetic recording medium using these particles can be more preferably used for recording and reproducing in a wavelength range of over 1 μm.

As the producing methods of these magnetic particles, the glass-crystallizing method disclosed by Japanese Patent Laid-Open Publication Serial No. SHO 56-67904, the hydro-thermal composite sintering method disclosed by Japanese Patent Laid-Open Publication Serial No. SHO 61-168532, and so forth can be suitably used.

Then, the magnetic recording medium in accordance with the present invention is generally described.

The magnetic recording medium in accordance with the present invention can be produced by using the above mentioned magnetic powder in the conventional method that follows. The magnetic powder, resin binder, and if necessary various additives are mixed and dispersed so as to produce a magnetic coating material. Thereafter, by coating the magnetic coating material on a base material, a magnetic layer is formed. Besides the magnetic powder and the binder resin, the various additives which can be contained in the magnetic layer are dispersant, lubricant, antistatic agent, and so forth. After the magnetic layer is formed, a magnetic field orientation process, a drying process, a surface smoothing process, and so forth are performed so as to obtain the magnetic recording medium in accordance with the present invention.

As the materials constructing the non-magnetic base material, polyester group such as polyethylene terephthalate (PET) and polyethylene naphthalate and other various materials such as polyolefin group and cellulose derivatives can be used.

As the resin binder of the magnetic recording medium in accordance with the present invention, any resin such as polyester resin, polyether resin, polyurethane resin, and polyacryl resin, which are normally used for magnetic recording media, can be used. Among these materials, a resin containing a repeating unit having at least one polar group selected from the group consisting of —$SO_3M$ and —$OSO_3M$ can be more preferably used. (M is hydrogen or an alkali metal atom).

The reason why the electromagnetic characteristics such as S/N ratio and reproducing output of the medium produced by using the magnetic powder in accordance with the present invention are superior to those of the medium using composite magnetic particles alone or single phase magnetic particles of hexagonal ferrite alone as a magnetic powder would be as follows.

Unlike the single phase magnetic particles of hexagonal ferrite (B), the composite magnetic particles (A) do not have a crystal structure with regularity, but an irregular combination of an S block of M type or of W type crystal structure and another S block.

On the other hand, the single phase magnetic particles of hexagonal ferrite (B) have either an M type crystal structure where sets of an S block and an R block are regularly arranged or a W type crystalline structure where sets of an S block, an R block and an R block are regularly arranged.

Thus, the crystal structure of the composite magnetic particles (A) differs from that of the single phase magnetic particles of hexagonal ferrite (B).

Although the composite magnetic particles contain a spinel structure ferrite having high saturation magnetization, the magnetic flux in the particles tends to form a closed magnetic path through the spinel structure ferrites which are disposed on the top and the bottom of the plate surface. This is because the spinel structure ferrites have small magnetic anisotropy and are easily magnetized in every direction. Thus, the magnetic flux in the particles of the composite magnetic particles do not contribute so much to the reproduction output of the medium. Particularly, in a short wavelength range where a demagnetization field works strongly, the magnetization of the spinel ferrite on the top and bottom plane S block inclines from the direction perpendicular to the plate surface and thereby forming the closed magnetic path.

As described above, since the magnetization of the composite magnetic particles tend to form a closed magnetic path, it is supposed that the magnetic cohesive force of it is weaker than that of single phase magnetic particle. Thus, by mixing a predetermined number of composite magnetic particles with single phase magnetic particles of hexagonal ferrite, the dispersion property of the magnetic powder of the hexagonal ferrite is effectively improved and thereby providing a low noise property and a high S/N ratio.

By disposing a predetermined number of single phase magnetic particles of the hexagonal ferrite (B), which are strongly magnetized along the vertical direction to the plate surface and their magnetization direction is hard to incline, among the composite magnetic particles, the magnetization of the S blocks disposed on the top and the bottom of the plate surface of the composite magnetic particles would become active. Thus, the reproduction output in accordance with the saturation magnetization intrinsic to the composite magnetic particles could be brought out.

The magnetic recording medium using the magnetic powder which is a mixture of the composite magnetic particles (A) and the single phase magnetic particles of hexagonal ferrite (B) shows lower noise than a magnetic recording medium using the single phase magnetic particles of hexagonal ferrite (B) does, thereby providing excellent electromagnetic characteristics.

Moreover, the magnetic recording medium in accordance with the present invention has a higher S/N ratio in a short wavelength range than a medium using the composite magnetic particles (A).

DESCRIPTION OF PREFERRED EMBODIMENTS

Embodiments in accordance with the present invention are described in the following examples.

Embodiments 1 to 8:

First, aqueous solutions of $BaCl_2$, $FeCl_3$, $CoCl_3$, and $TiCl_4$ were prepared and mixed so that the composition of Co—Ti substituted Ba ferrite given by the chemical formula: $Ba Fe_{12-2x} Co_x Ti_x O_{19}$ (where x=0.6) was obtained. Thereafter, an alkaline substance was added to the mixed solution and then the coprecipitate including Ba, Fe, Co, and Ti atoms was precipitated at pH 13. Thereafter, the resultant mixture was heated for four hours at 100° C. Thus, a starting compound of the Co—Ti substituted Ba ferrite was produced. Thereafter, equivalent molar amounts of $NiCl_2$ and $ZnCl_2$ and four times molar amount of $FeCl_3$ were added to a slurry of the starting compound which was heated to 100° C. The resultant slurry was referred to as the slurry (A).

On the other hand, aqueous solutions of $BaCl_2$, $FeCl_3$, $CoCl_3$, and $TiCl_4$ were prepared and mixed so that the composition of a Co—Ti substituted Ba ferrite given by the chemical formula: $Ba Fe_{12-2x} Co_x Ti_x O_{19}$ (where X=0.75) was obtained. Thereafter, an alkaline substance was added to the mixed solution and then the coprecipitate was precipitated at pH 13. Thereafter, the resultant mixture was heated for four hours at 100° C. Thus, a starting compound of the Co—Ti substitute Ba ferrite was produced. The resultant slurry was referred to as the slurry (B).

Thereafter, mixtures 1 to 8 where the slurry (A) and the slurry (B) were mixed with various mixing rates were hydrothermally reacted and thereby mixed starting compound slurries 1 to 8 were produced. Thereafter, these mixed starting compound slurries 1 to 8 were rinsed with water until their hydrogen ion concentrations became pH 8 or below.

Thereafter, the resultant mixed starting compound slurries 1 to 8 were mixed with $BaCl_2$ (the weight ratio of $BaCl_2$ to the dried mixed starting compound was 1:1) and then satisfactorily stirred. Thereafter, the resultant mixtures were dried with a spray dryer. The resultant dried mixtures 1 to 8 were thermally processed for two hours at 900° C. Thereafter, the mixtures were rinsed with water so as to remove $BaCl_2$ flux therefrom. Thus, magnetic powder specimens 1 to 8 which were embodiment examples in accordance with the present invention were produced.

As results of X-ray diffraction of the magnetic powders thus produced, it was found that they had a mixed phase of M (magnetoplumbite) type ferrite and spinel structure ferrite. In addition, the surface of these magnetic powder specimens were analyzed with transmission electron microscopic photographs (acceleration voltage=400 kV; magnification= 2,000,000 times). As a result of the analysis, it was found that composite magnetic particles (A) where spinel ferrite and magnetoplumbite type ferrite were integrated and single phase magnetic particles of magnetoplumbite type ferrite (B) coexisted.

Next, separately, a single phase magnetic powder and a composite magnetic powder were prepared by the following methods.

An alkaline substance was added to the mixture of aqueous solutions of $BaCl_2$, $FeCl_3$, $CoCl_2$ and $TiCl_4$ with predetermined amount respectively to obtain coprecipitate, whose composition was given by the chemical formula: $BaFe_{12-2x}Co_xTi_xO_{19}$ (where x=0.75), at pH 13. The resultant coprecipitate was heated at 100° C., and then hydrothermally reacted at 250° C. Thereafter, the hydrothermally reacted coprecipitate was rinsed with water until its hydrogen ion concentration became pH 8. The resultant slurry was mixed with $BaCl_2$ as flux, and was dried with a spray dryer. The resultant dried mixture was thermally processed for two hours at 900° C. Thereafter, the mixture was rinsed with water so as to remove $BaCl_2$ added as flux therefrom. Thus, magnetic powder specimen 9 composed of single phase magnetic powder was produced. The single phase magnetic powder has a saturation magnetization of 56 emu/g, a coercive force of 850 Oe, an average particle diameter of 43 nm and a ratio to an aspect ratio of 3.0.

An alkaline substance was added to the mixture of aqueous solutions of $BaCl_2$, $FeCl_3$, $CoCl_2$ and $TiCl_4$ with predetermined amount respectively to obtain coprecipitate, whose composition was given by the chemical formula: $BaFe_{12-2x} Co_xTi_xO_{19}$ (where x=0.60). The resultant coprecipitate was heated at 100° C. Thereafter, equivalent molar amounts of $NiCl_2$ and $ZnCl_2$ and four times molar amounts of $FeCl_3$ were added to the coprecipitate. Then, the mixture was hydrothermally reacted at 250° C. The hydrothermally reacted mixture was rinsed with water until its hydrogen ion concentration became pH 8. The resultant slurry was mixed with $BaCl_3$ as flux, and was dried with a spray drier. The resultant dried mixture was thermally processed for two hours at 900° C. Thereafter, the mixture was rinsed with water so as to remove $BaCl_2$ added as flux therefrom. Thus, magnetic powder specimen 10 composed of composite magnetic particles was produced. The composite magnetic powder has a saturation magnetization of 65 emu/g, a coercive force of 870 Oe, an average particle diameter of 43 nm and an aspect ratio of 3.0.

Magnetic coating material 1 to 10 were produced with the magnetic powder specimens 1 to 10 by the following method.

First, the following compositions of magnetic coating materials except Colonate L were kneaded in a sand mill for 1 hour, 3 hours, 5 hours and 10 hours respectively. In order to evaluate the dispersion of thus obtained magnetic powder, the glossiness of the films, which were coated with each magnetic powder and then dried, was evaluated with incident angle of 60° according to the kneading time. The result is shown in Table 1.

TABLE 1

|  | Mixing ratio | Kneading Time (hrs) | | | |
|---|---|---|---|---|---|
|  | A:B | 1 | 3 | 5 | 10 |
| magnetic coating material 1 | 5:95 | 113 | 121 | 129 | 140 |
| magnetic coating material 2 | 7:93 | 120 | 129 | 135 | 143 |
| magnetic coating material 3 | 10:90 | 125 | 133 | 138 | 144 |
| magnetic coating material 4 | 30:70 | 130 | 136 | 140 | 145 |
| magnetic coating material 5 | 50:50 | 135 | 140 | 143 | 145 |
| magnetic coating material 6 | 70:30 | 139 | 143 | 145 | 146 |
| magnetic coating material 7 | 90:10 | 141 | 143 | 145 | 146 |
| magnetic coating material 8 | 95:5 | 141 | 145 | 145 | 146 |
| magnetic coating material 9 | 0:100 | 105 | 111 | 117 | 133 |
| magnetic coating material 10 | 100:0 | 140 | 146 | 145 | 146 |

Thereafter, the magnetic coating materials 1 to 8 were kneaded for 10 hours as described above, and filtered through a filter with 1-μm meshes to remove aggregations. Colonate L was added to thus obtained materials and the resultant materials were applied on PET films.

Thereafter, the surface of the PET films was smoothened by a calender process. Thereafter, the resultant films were slitted in ½ inch width. Thus, medium specimens 1 to 8 were obtained. The magnetic powder specimen numbers accord with the medium specimen numbers which were produced therewith.

| Composition of magnetic coating material: | |
|---|---|
| Magnetic powder | 100 parts by weight |
| Copolymer of vinyl chloride and vinyl acetate | 10 parts by weight |
| Polyurethane | 10 parts by weight |
| Lecithin | 4 parts by weight |

-continued

| Composition of magnetic coating material: | |
|---|---|
| Methyl isobutyl ketone | 93 parts by weight |
| Toluene | 93 parts by weight |
| Colonate L (a trade name of Nippon Polyurethane K.K., Polyisocyanate compound) | 3 parts by weight |

Thereafter, to examine the properties of the medium specimens 1 to 8, their noise and S/N ratio in short and middle wavelength ranges were measured. To measure such properties, a ring type ferrite head with gap width=0.3 μm, track width=35 μm, and relative speed between head and tape =3.75 m/sec was used. The S/N ratio in the middle wavelength range was measured with signals having a recording wavelength of 1.0 μm. The S/N ratio in the short wavelength range was measured with signals having a recording wavelength of 0.4 μm. In addition, the noise of medium was measured from an integrated value of a noise component in a frequency range from 200 kHz to 6 MHz.

Moreover, the surface roughness of the magnetic phase of each specimen was measured.

Table 2 lists the mixing ratios of the particles and magnetic properties with respect to the magnetic powder specimens 1 to 8 and the evaluation results thereof.

Comparison Example

Medium specimens 1 and 2 as comparison examples were produced in the same manner as described above except using magnetic coating material 9 and 10 instead of the magnetic coating materials 1 to 8. Thereafter, the same evaluation as applied to the medium specimens 1 to 8 was applied to the medium specimens 1 and 2. The result is shown in Table 2.

TABLE 2

|  | Mixing ratio | Saturation magnetization | Coercive force (Oe) | | Short wavelength | Middle wavelength |
|---|---|---|---|---|---|---|
|  | A:B | (emu/g) | powder | medium | S/N (dB) | (S/N (dB) |
| Embodiment 1 | 5:95 | 56 | 860 | 870 | +1.2 | +0.8 |
| Embodiment 2 | 7:93 | 57 | 860 | 870 | +1.6 | +1.3 |
| Embodiment 3 | 10:90 | 57 | 850 | 860 | +2.4 | +1.7 |
| Embodiment 4 | 30:70 | 59 | 830 | 840 | +2.5 | +2.5 |
| Embodiment 5 | 50:50 | 60 | 860 | 860 | +1.6 | +3.1 |
| Embodiment 6 | 70:30 | 61 | 850 | 850 | +1.4 | +2.8 |
| Embodiment 7 | 90:10 | 63 | 860 | 850 | +1.3 | +2.4 |
| Embodiment 8 | 95:5 | 65 | 870 | 850 | +1.2 | +2.2 |
| Comparison 1 | 0:100 | 56 | 850 | 860 | 0 | 0 |
| Comparison 2 | 100:0 | 65 | 860 | 850 | +1.0 | +1.5 |

Table 1 shows the magnetic coating material with larger percentage of the composite magnetic particles (A) than that of the single phase magnetic particles of hexagonal ferrite (B) enables sufficient dispersion in shorter time. Table 1 also shows that effect on improving dispersion property is saturated where the mixing ratio of the composite magnetic particles (A) and the single phase magnetic particles of hexagonal ferrite (B) is 70:30. Therefore, even if the ratio of composite magnetic powder increases over this ratio, there cannot be seen any effect on a dispersion property.

Table 2 shows that although Comparison 2 produced with the magnetic powder specimen 10 composed of composite magnetic particles has sufficiently high saturation magnetization, for S/N ratio, each Embodiment was superior to Comparison 2.

Considering the consequences mentioned above, magnetic powder consisting of both the composite magnetic particles (A) and the single phase magnetic particles of hexagonal ferrite (B) not only require less time for dispersion but also has a higher S/N ratio than a magnetic powder consisting of either only the composite magnetic particles (A) or only the single phase magnetic particles of hexagonal ferrite (B).

Among the magnetic powder whose mixing ratio of the composite magnetic particles (A) and the single phase magnetic particles of hexagonal ferrite (B) is in the range from 5:95 to 95:5, that with a mixing ration in the range from 70:30 to 95:5 accomplishes particularly excellent effect.

As shown in Table 2, since the magnetic powder for magnetic recording in accordance with the present invention comprises composite magnetic particles (A) and single phase magnetic particles of hexagonal ferrite (B), the magnetic powder has a higher dispersion property than a magnetic powder for magnetic recording using only the single phase magnetic particles of hexagonal ferrite (B), thereby reducing noise and providing an excellent S/N ratio both in a short wavelength range and a middle wavelength range.

Since the S/N ratio in the short wavelength range of the magnetic recording medium only using the composite magnetic particles (A) as a magnetic powder for magnetic recording is +1.0 (dB), it is found that this is an excellent effect accomplished by the present invention.

In addition, when the mixing ratio of the composite magnetic particles (A) and the single phase magnetic particles of hexagonal ferrite (B) is in the range from 30:70 to 95:5, since an excellent dispersion property can be obtained, the surface property of the magnetic phase of the recording medium is improved, thereby reducing noise.

In the magnetic recording techniques, when a reproducing output is amplified, noise component is also amplified. Thus, to obtain a high S/N ratio, it is necessary to decrease the noise component. When the mixing ratio of the composite magnetic particles (A) and the single phase magnetic particles of hexagonal ferrite (B) is in the range from 70:30 to 95:5, S/N ratio and the dispersion of the magnetic powder were preferably improved.

In consideration of a wavelength range of over 1 μm for use with color signals of video tapes, when the above mentioned mixing ratio was in the range from 70:30 to 95:5, S/N ratio was preferably improved.

For example, when a signal was recorded with a recording wavelength of 5 μm on the media of the embodiments 2 and 7, their S/N ratios were +1.2 and +4.4 (dB) respectively, while the S/N ratio of the medium of the comparison example was 0.

On the other hand, in recording and reproducing a signal in a short wavelength range of 1 μm or below, when the mixing ratio of the composite magnetic particles (A) and the single phase magnetic particles of hexagonal ferrite (B) were in the range from 5:95 to 30:70, an excellent S/N ratio and the dispersion of the magnetic powder could be obtained. This S/N ratio is most suitable for high density digital recording.

As was described above, according to the present invention, when composite type ferrite magnetic particles (A) coexist with single phase magnetic particles of hexagonal ferrite (B), the dispersion property of the hexagonal ferrite magnetic powder (B) can be improved. Thus, the magnetic powder which can be used for production of a magnetic recording medium which reduces noise and has a high S/N ratio and a high reproducing output can be obtained.

What is claimed is:

1. A magnetic powder for magnetic recording, comprising a mixture of:

composite magnetic particles (A), each of said particles (A) containing hexagonal ferrite and spinel structure ferrite; and single phase magnetic particles of hexagonal ferrite (B), wherein the average particle diameter of said composite magnetic particles (A) is in the range from 0.02 to 0.2 μm; and the average particle diameter of said single phase magnetic particles of hexagonal ferrite (B) is in the range from 0.02 to 0.2 μm.

2. A magnetic powder for magnetic recording according to claim 1, wherein the mixing ratio (A):(B) of said composite magnetic particles (A) and said single phase magnetic particles of hexagonal ferrite (B) is in the range from 5:95 to 95:5.

3. A magnetic powder for magnetic recording according to claim 2, wherein said composite magnetic particles (A) is a ferrite substantially given by the chemical formula (1);

$$AO \cdot n\ (Fe_{12-X-Y} M(1)_X M(2)_Y O_{18-Z}) \quad \ldots (1)$$

where A is at least one element selected from the group consisting of Ba, Sr, Ca, and Pb; M(1) is at least one element selected from the group consisting of Co, Zn, Ni, Cu, Mn, and Fe(II); M(2) is at least one element selected from the group consisting of Ti, Ge, Sn, Sb, Nb, V, Zr, W and Mo; x is a number in the range from 0.5 to 3.0; Y is a number in the range from 0 to 2.0; Z is a number which is 0.05 or larger and is given by [X+(3-m) Y]/2, where m is the average valence of M(2); and n is a number in the range from 1.0 to 2.0.

4. A magnetic powder for magnetic recording according to claim 2, wherein said single phase magnetic particles of hexagonal ferrite (B) is a ferrite substantially given by the chemical formula (2) or (3);

$$AO \cdot Fe_{12-X-Y} M(1)_X M(2)_Y O_{18} \quad \ldots (2)$$

where A is at least one element selected from the group consisting of Ba, Sr, Ca, and Pb; M(1) is at least one element selected from the group consisting of Co, Zn, Ni, Mn, and Cu; M(2) is at least one element selected from the group consisting of Sn, Ti, Ge, V, Nb, Ta, Sb, W, and Mo; X is a number in the range from 0.1 to 1.5; and Y is a number in the range from 0.1 to 1.5;

$$AO \cdot M(1)_2 Fe_{16-X-Y} M(2)_X M(3)_Y O_{26} \quad \ldots (3)$$

where A is at least one element selected from the group consisting of Ba, Sr, Ca, and Pb; M(1) is at least one element selected from the group consisting of Co, Zn, Ni, Cu, Fe, Mn, and Fe(II); M(2) is at least one element selected from the group consisting of Co, Zn, Ni, Mn, Cu, and Fe(II); M(3) is at least one element selected from the group consisting of Sn, Ti, Zr, Ge, V, Nb, Ta, Sb, W, and Mo; X is a number in the range from 0.1 to 1.5; and Y is a number in the range from 0.1 to 1.5.

5. A magnetic powder for magnetic recording according to claim 1, wherein the mixing ratio (A):(B) of said composite magnetic particles (A) and said single phase magnetic particles of hexagonal ferrite (B) is in the range from 5:95 to 30:70.

6. A magnetic powder for magnetic recording according to claim 1, wherein the mixing ratio (A):(B) of said composite magnetic particles (A) and said single phase magnetic particles of hexagonal ferrite (B) is in the range from 70:30 to 95:5.

7. The magnetic powder for magnetic recording according to claim 1, wherein the coercive force (Hc) of said composite magnetic particles (A) is in the range from 200 to 2000 Oe; and the coercive force (Hc) of said single phase magnetic particles of hexagonal ferrite is in the range from 200 to 2000 Oe.

* * * * *